United States Patent Office 3,264,168
Patented August 2, 1966

3,264,168
ETHYLENE-PROPYLENE COPOLYMER RUBBER-FABRIC LAMINATES AND METHOD OF MAKING SAME
Loy D. Sneary, Bartlesville, Okla., assignor to Phillips Petroleum Company, a corporation of Delaware
No Drawing. Filed June 27, 1960, Ser. No. 38,771
7 Claims. (Cl. 161—227)

This invention relates to rubber-fabric laminates wherein the rubber is an ethylene-propylene copolymer. In one aspect this invention relates to a particular bonding agent for effecting a bond between the ethylene-propylene rubber and the fabric to form a laminate. In still another aspect this invention relates to the production of ethylene-propylene copolymer rubber-fabric laminates utilizing partially hydrogenated polybutadiene as the bonding agent. In still another aspect this invention relates to the manufacture of rubber tires, belts, and other articles composed principally or in part of a laminate of fabric and ethylene-propylene copolymer rubber.

In the manufacture of tires, belts, and the like, various materials have been suggested as bonding agents for bonding the rubber, such as the rubber of the tread and side walls, to the fabric carcass of the tire. These materials have included rubber latex, dispersions of rubber, and solutions of synthetic rubber such as butadiene-vinyl heterocyclic nitrogen base copolymer.

Recently rubbery copolymers of ethylene and propylene have been developed which display properties which make these copolymers particularly applicable for use in tires, belts and the like. For example, a copolymer rubber containing about 60 to 70 mole percent ethylene and about 30 to 40 mole percent propylene displays properties of weathering, ozone resistance, and wear resistance which are superior to those properties of natural and conventional synthetic rubber such as SBR (butadiene-styrene copolymer rubber). In the manufacture of tires utilizing ethylene-propylene copolymer rubber (EPR) difficulty has been experienced in obtaining a satisfactory bond between the rubber and the fabric of the tire carcass. This has been true when either nylon or rayon has been used to fabric the tire carcass. The bonding agents which have proved successful in bonding natural and conventional synthetic rubbers to these fabrics have not provided a satisfactory bond between these fabrics and the ethylene-propylene copolymer rubber.

Therefore a principal object of the invention is the provision of a bonding agent for bonding together a fabric and an ethylene-propylene copolymer rubber. It is also an object of this invention to provide a process for effecting a satisfactory bond between an ethylene-propylene copolymer rubber and a fabric. A further object of this invention is to provide a laminate of fabric and an ethylene-propylene copolymer rubber. Other objects, features and advantages of the invention will become apparent to one skilled in the art upon reading this disclosure of the invention including the detailed description of the invention.

Broadly, the invention is based upon the discovery that a partially hydrogenated polymer of butadiene will effect a tenacious bond between an ethylene-propylene copolymer rubber and a fabric which has been treated with the partially hydrogenated butadiene polymer. The bond between the ethylene-propylene copolymer rubber and the fabric which has been treated with the hydrogenated polybutadiene is satisfactory for the manufacture of tires utilizing ethylene-propylene copolymer rubber whereas other bonding agents, such as those which have heretofore been used in the tire industry, do not effect a bond which is satisfactory for the manufacture of tires from ethylene-propylene copolymer rubber.

The hydrogenated polybutadiene which is particularly suitable for the process of the invention can be prepared by the process described in U.S. Patent 2,864,809, issued December 16, 1958, to R. V. Jones and C. W. Moberly. The process comprises dispersing or dissolving the butadiene polymer in a solvent such as cyclohexane, methylcyclohexane, decalin, and the like, and contacting the mixture with hydrogen in the presence of a nickel-kieselguhr catalyst which has been activated by contact with hydrogen. The hydrogenation reaction is conducted until the unsaturation has been reduced to not more than about 50 percent of the original unsaturation of the polymer as determined by the method of Lee et al., Journal of Polymer Science, 3, 6684 (1948). Preferably, the unsaturation is in the range of about 5 to about 30 percent of the original unsaturation of the polymer. Stated in another way, the partially hydrogenated polymer is from about 50 to about 95 percent saturated. The polymers used for preparing the hydrogenated polymers of this invention can be prepared by the emulsion polymerization of butadiene, the temperature for the polymerization ranging from about —5° F. to about 140° F., preferably from about 20° F. to about 60° F., as described in the above referred-to patent. The polymers can also be prepared by the solution process or by mass polymerization. Suitable catalysts include organometallic compounds such as a mixture of triethyl aluminum and titanium iodide; alkali metal alkyls such as butyl lithium; and alkali metals such as lithium.

The ethylene-propylene copolymer rubber compositions used in the manufacture of tires and belts can be cured or vulcanized using peroxide-type vulcanization agents or other suitable vulcanizing agents.

For the preparation of the rubber-fabric laminates according to the process of this invention, the hydrogenated polymer to be utilized as the bonding agent is dissolved in a suitable solvent such as xylene, benzene, cyclohexane, methylcyclohexane, Decalin, toluene, and the like. It is sometimes advantageous to heat the mixture of hydrogenated polybutadiene and solvent to effect solution of the polymer after which the solution can be cooled for use. Solutions containing less than about 5 percent by weight of polymer are, in general, fairly easy to prepare and are of low viscosity while those of higher concentration, such as solutions containing 10 weight percent polymer and higher, are frequently quite viscous and tend to be subject to gelation. Solutions which have gelled can generally be resolved by heating slightly and then allowing the solution to cool. The polymer solutions which are particularly applicable for use in the process of this invention will generally contain from about 0.5 to about 10 percent by weight of polymer; however, it may be desirable in some instances to use solutions of lower concentration or solutions of higher concentration.

Tire cord or fabric to be treated in accordance with the present invention is passed through a solution of the polymer and is either squeezed or allowed to drain so as to remove excess solution, after which the treated cord is dried. The temperature of this treating operation can be varied over a wide range which is limited only by the concentration and properties of the treating solution. The temperature should be high enough to avoid gelation of the hydrogenated polymer solution and should not be so high as to result in excessive evaporation of the solvent. Thus the treating operation can be conducted over a temperature range including from about 0° F. to about 200° F.

After the fabric is treated with the solution of hydrogenated polymer the treated fabric is dried, usually at an elevated temperature, so as to remove substantially all of the solvent therefrom. The treated and dried fabric is ready for immediate use; however, it can also be stored for indefinite periods at ordinary temperatures with no deleterious results with respect to its ability to bond the fabric to ethylene-propylene copolymer rubber. The treated fabric is then used in the manufacture of tires, utilizing ethylene-propylene copolymer rubber in accordance with the usual tire manufacturing procedures.

The process of this invention is particularly valuable for bonding ethylene-propylene copolymer rubber to cotton, rayon, and nylon for the manufacture of tires, belts and the like.

The following examples will be helpful for a better understanding of the invention but are not to be construed as limiting the invention:

EXAMPLE I

Nylon tire cords and rayon tire cords were dipped in a 2 percent solution of partially hydrogenated polybutadiene prepared according to the process of U.S. Patent 2,864,-809, referred to hereinbefore, and having an unsaturation value of 8.1 percent.

Similar rayon and nylon tire cords were dipped in a commercial bonding agent which is used extensively in the tire industry for bonding butadiene-styrene copolymer rubber to fabric in the production of automobile tires and which contains a butadiene-vinylpyridine copolymer latex and a thermoplastic resin solution. The commercial bonding agent solution contained 4.8 weight percent solids. The commercial bonding agent, Gen-Tac (trademark), is available from the General Tire Company.

The tire cords were dried in a desiccator, dipped in the solutions, drained, and dried in an oven at 212° F. for 30 minutes. Representative samples were weighed before and after dipping and the dips were adjusted so as to deposit substantially the same amount of solids in each case. Because of differences in solids contents and viscosities of the two dips, it was determined that three dips of the cords in the hydrogenated polybutadiene solution were equivalent to one dip in the commercial bonding agent solution.

The treated and dried cord samples were then used in the preparation of laminates with ethylene-propylene copolymer rubber and with butadiene-styrene copolymer rubber. Standard H-adhesion specimens were prepared and cured at 370° F. for 30 minutes. The "H" adhesion test is described in India Rubber World, pages 114–213 (May 1946). The data in the following table were obtained from the H-adhesions pulled at 20 inches per minute.

*Adhesion tests*

| Polymer | Type Cord | Cord Dip [1] | Pounds | |
|---|---|---|---|---|
| | | | Average Pull | Total Range |
| Ethylene-Propylene Rubber | Rayon | A | 7.8 | 4.6–10.4 |
| Do | do | B | 17.9 | 16–20 |
| Do | do | A+B | 14.9 | 13.4–16.4 |
| Do | do | None | 6.4 | 6–6.6 |
| Do | Nylon | A | 8.9 | 5.7–11.8 |
| Do | do | B | 12.2 | 10.8–13.0 |
| Do | do | A+B | 13.3 | 12.5–14.2 |
| Do | do | None | 6.0 | 5.7–6.5 |
| Butadiene-Styrene Rubber | Rayon | A | 27.6 | 25.7–28.5 |
| Do | do | B | 15.5 | 14.4–17.2 |
| Do | do | A+B | 15.6 | 14.8–16.0 |
| Do | do | None | 14.2 | 13.5–14.8 |
| Do | Nylon | A | 21.9 | 20.5–22.5 |
| Do | do | B | 8.4 | 5.8–12.0 |
| Do | do | A+B | 11.8 | 8.0–13.5 |
| Do | do | None | 12.8 | 12.5–13.2 |

[1] A=Commercial bonding agent. B=Partly hydrogenated polybutadiene.

The above results show that partially hydrogenated polybutadiene was more effective for bonding fabric to EPR than the bonding agent which is accepted by the tire industry for the manufacture of butadiene-styrene copolymer rubber tires and, in most instances, was better than a combination of the two bonding agents. The average pull figures were an average of six determinations.

The adhesion of the fabric to the ethylene-propylene copolymer rubber can be further improved by dissolving from about 1/10 to about 1 weight percent of dicumyl peroxide in the partially hydrogenated polybutadiene solution.

Reasonable variations and modifications are possible within the scope of this disclosure without departing from the spirit and scope of the invention.

That which is claimed is:

1. A process for bonding an ethylene-propylene copolymer rubber to a fabric selected from the group consisting of rayon, nylon and cotton which comprises treating said fabric with a solution consisting essentially of partly hydrogenated polybutadiene in an organic solvent wherein the partly hydrogenated polybutadiene is about 50 to 95 percent saturated; removing solvent from the treated fabric; applying a layer of ethylene-propylene copolymer rubber thereto; and heating the resulting laminate to cure the rubber and form a strong rubber-to-fabric bond.

2. A process for bonding an ethylene-propylene copolymer rubber to a fabric selected from the group consisting of rayon, nylon and cotton which comprises treating said fabric with a solution consisting essentially of an organic solvent containing at least about 0.5 weight percent of partly hydrogenated polybutadiene, wherein the partly hydrogenated polybutadiene is about 50 to 95 percent saturated; removing solvent from the treated fabric; applying a layer of ethylene-propylene copolymer rubber thereto; and applying heat and pressure to the rsulting laminate to cure the rubber and form a bond.

3. The process of claim 2 wherein the partly hydrogenated polybutadiene solution contains from about 0.5 to about 10 weight percent partly hydrogenated polybutadiene.

4. The process of claim 3 wherein the hydrogenated polybutadiene is from about 70 to 95 percent saturated.

5. An ethylene-propylene copolymer rubber-fabric laminate which comprises at least one fabric selected from the group consisting of rayon, nylon and cotton and a layer of said rubber, the layers of said laminate having been bonded together at a rubber curing temperature by a layer of hydrogenated polybutadiene wherein the said hydrogenated polybutadiene is about 50 to 95 percent saturated.

6. A laminate comprising fabric selected from the group consisting of rayon, nylon and cotton and an ethylene-propylene copolymer rubber bonded together at a rubber curing temperature with an intermediate layer of partly hydrogenated polybutadiene wherein said partly hydrogenated polybutadiene is about 50 to 95 percent saturated.

7. A vulcanized laminate comprising fabric, selected from the group consisting of rayon, nylon and cotton, which has been treated with a solution consisting essentially of an organic solvent containing at least about 5 weight percent of partly hydrogenated polybutadiene wherein said partly hydrogenated polybutadiene is about 50 to 95 percent saturated and which treated fabric has been dried to remove the solvent; and an ethylene-propylene copolymer rubber.

References Cited by the Examiner

UNITED STATES PATENTS 2,262,608　11/1941　Humphrey ——————— 156—110
2,264,295　12/1941　Carter ——————— 161—249 X (Other references on following page)

UNITED STATES PATENTS

| | | | |
|---|---|---|---|
| 2,570,895 | 10/1951 | Wilson | 154—139 |
| 2,625,499 | 1/1953 | Nebesar. | |
| 2,864,809 | 12/1958 | Jones et al. | |
| 3,111,451 | 11/1963 | Peters | 161—253 |

OTHER REFERENCES

Polyethene (The Technology and Use of Eythylene Polymers), edited by Renfrew and Morgan, 2nd edition, published by Interscience Publishers Inc., January 1960, page 351 relied on.

EARL M. BERGERT, *Primary Examiner.*

CARL F. KRAFFT, ALEXANDER WYMAN,
*Examiners.*

C. S. STEIN, R. J. CARLSON, C. B. COSBY,
*Assistant Examiners.*